(No Model.)
W. H. BINNS.
DEVICE FOR TRANSMITTING MOTION.
No. 256,627. Patented Apr. 18, 1882.
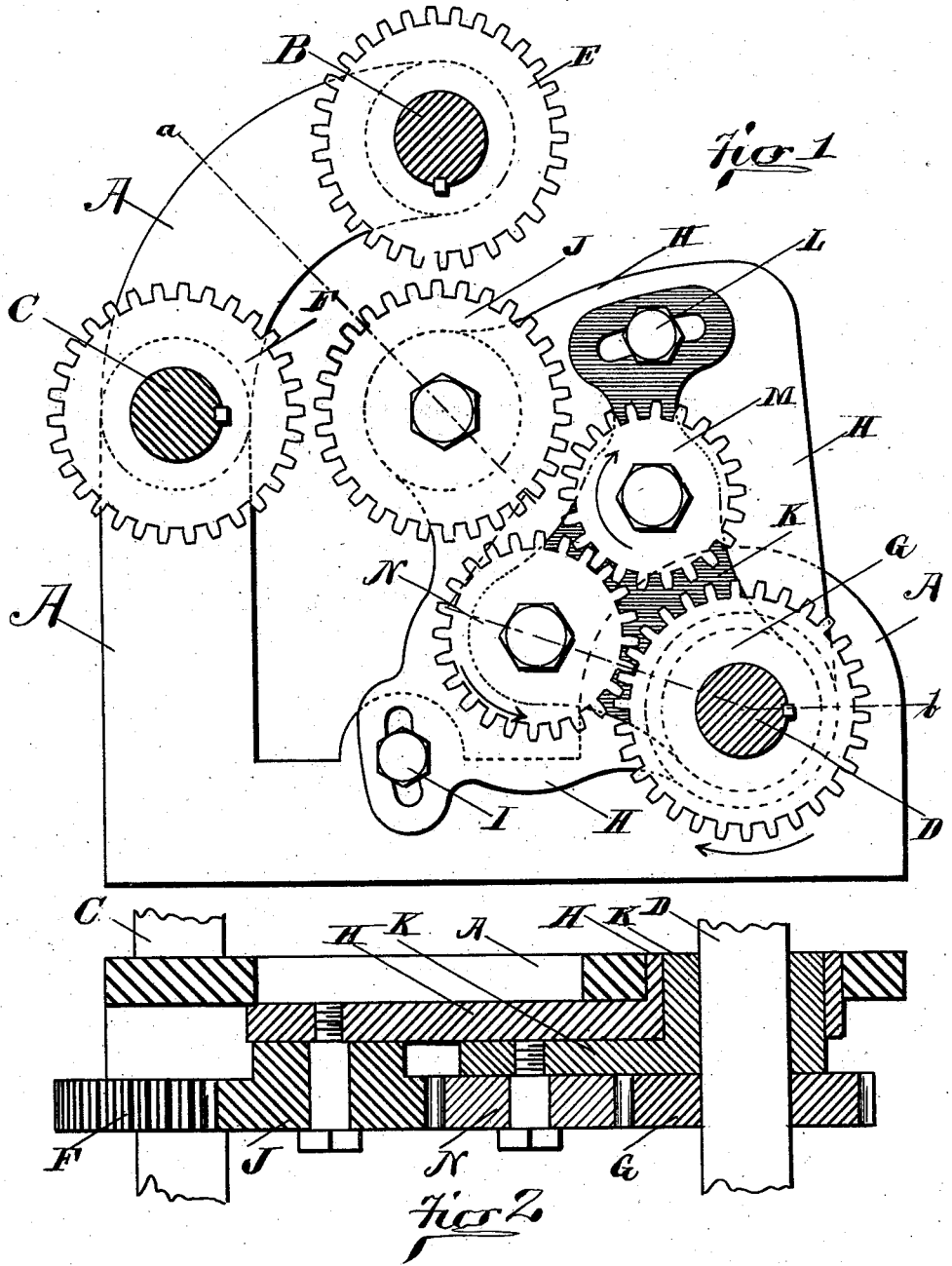

UNITED STATES PATENT OFFICE.

WILLIAM H. BINNS, OF NEWPORT, KENTUCKY.

DEVICE FOR TRANSMITTING MOTION.

SPECIFICATION forming part of Letters Patent No. 256,627, dated April 18, 1882.

Application filed March 16, 1882. (No model.)

*To all whom it may concern:*

Be it known that I, WILLIAM H. BINNS, of Newport, Campbell county, Kentucky, have invented certain new and useful Improvements in Transmitting Motion, of which the following is a specification.

This invention relates to a device for transmitting rotary motion in either direction from a driving-shaft to either of two driven shafts, and reversely for transmitting rotary motion from either of two driving-shafts in either direction of rotation to a driven shaft.

In the accompanying drawings, Figure 1 is a front elevation of the device, and Fig. 2 is a section on line *a b*.

In Fig. 1, D is the driving-shaft, fitted with gear G; B, a driven shaft fitted with gear E, and C a driven shaft fitted with gear F. These shafts are held in a fixed relation to each other, as by the housing A.

H is a tumbler fitted to oscillate upon the axis of shaft D, and adapted to be fixed, after adjustment, by the screw I. This tumbler carries the idle-gear J, so located that by the oscillatory adjustment of tumbler H it can be caused to engage with either of the gears E and F.

K is a tumbler fitted to oscillate upon the axis of the shaft D, and adapted to be fixed in its relation to tumbler H, after adjustment, by screw L. This tumbler carries the idle-gear N, engaging with driving-gear G, and also the idle-gear M, so located as to engage with gear N, and by means of the oscillatory adjustment of tumbler K with reference to tumbler H capable of being caused to engage with the gear J. The tumbler K, with its gears M and N, after being fixed in its adjustment, moves with the tumbler H as it is being adjusted.

For the simple clamp-screws I and L any suitable devices—such as levers, cams, eccentrics, &c.—may be substituted.

The shafts B, C, and D, instead of being the main shafts of a machine, may be intermediate elements for a further transmission, and the shafts may be omitted where further transmissions are to be effected through their gears.

All the gears may be friction-gears instead of toothed gears, when the use of such gears is permissible.

The operation of the device is as follows: Assume the driving gear G to be continuously revolving in the direction of the arrow, the idle-gears M and N will then continuously revolve in opposite directions, as indicated by the arrows. The adjustment of tumbler K with reference to tumbler H may cause either of the gears M N to engage with gear J. Gear J will then be continuously revolved in a direction predetermined by the adjustment of the tumbler K.

The adjustment of the tumbler H may cause the gear J to engage with either of the driven gears F and E and cause it to revolve continuously in a direction predetermined by the adjustment of the tumbler K. While one of the gears E F is being revolved the tumbler K may be readjusted to reverse the direction of motion. In this way rotary motion in either direction may be transmitted to either gear E F by the gear G, which revolves continuously in one direction.

The gears E F may be made the driving-gears and the gear G the driven gear, and the gears E F may differ in size, or they may differ in their velocities of revolution. In this case motion in either direction may be transmitted to the gear G from either of the gears E and F.

The tumbler K is shown and described as oscillatory upon the axis of the gear G. It may oscillate upon the axis of the gear J without change of effect, except that fewer gears will be idly revolved when the parts are in neutral adjustment. This may in some cases be advantageous.

I claim as my invention—

The six gears and two tumblers combined substantially in the manner set forth.

WILLIAM H. BINNS.

Witnesses:
J. W. SEE,
JOHN LORENZ.